(12) United States Patent
Specht et al.

(10) Patent No.: US 6,705,558 B2
(45) Date of Patent: Mar. 16, 2004

(54) SEAT BELT RETRACTOR WITH A LOAD LIMITER

(75) Inventors: Martin Specht, Feldafing (DE); Walter Krauss, München (DE); Thomas Kilian, Germering (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/058,752

(22) Filed: Jan. 30, 2002

(65) Prior Publication Data

US 2002/0145068 A1 Oct. 10, 2002

(30) Foreign Application Priority Data

Apr. 9, 2001 (DE) .......................... 101 17 682

(51) Int. Cl.[7] .................. B60R 22/343; B60R 22/36
(52) U.S. Cl. .................... 242/379.1; 242/384
(58) Field of Search ........................ 242/384, 384.2, 242/379.1; 297/476, 477, 478; 280/805, 806, 807

(56) References Cited

U.S. PATENT DOCUMENTS

| | | | |
|---|---|---|---|
| 4,273,361 A | 6/1981 | Takei et al. ............... 280/805 |
| 4,322,046 A * | 3/1982 | Tanaka et al. ............. 242/379.1 |
| 5,388,780 A * | 2/1995 | Matsuki ..................... 242/384 |
| 5,611,498 A * | 3/1997 | Miller et al. ............... 242/379.1 |
| 5,618,006 A * | 4/1997 | Sayles ....................... 242/379.1 |
| 5,788,177 A | 8/1998 | Keller et al. .............. 242/379.1 |
| 5,924,641 A | 7/1999 | Keller et al. .............. 242/379.1 |
| 5,984,223 A | 11/1999 | Hiramatsu ................ 242/379.1 |
| 6,105,893 A | 8/2000 | Schmidt et al. ............ 242/374 |
| 6,206,315 B1 * | 3/2001 | Wier ........................ 242/379.1 |
| 6,241,172 B1 | 6/2001 | Fungel et al. ............. 242/379.1 |
| 6,264,127 B1 | 7/2001 | Blackadder et al. ....... 242/379.1 |
| 6,302,346 B1 * | 10/2001 | Brown et al. .............. 242/379.1 |
| 6,360,981 B1 | 3/2002 | Specht ...................... 242/390.8 |
| 6,435,441 B1 * | 8/2002 | Kajiyama et al. ......... 242/379.1 |
| 6,499,554 B1 * | 12/2002 | Yano et al. ................. 180/268 |

* cited by examiner

*Primary Examiner*—Kathy Matecki
*Assistant Examiner*—Scott J. Haugland
(74) *Attorney, Agent, or Firm*—Jarett Rieger; Lonnie Drayer

(57) ABSTRACT

A seat belt retractor for a seat belt system in a motor vehicle has a belt reel for the winding and unwinding of seat belt webbing. At least one locking element can lock the belt reel against further rotation. Forces exerted by the seat belt webbing can be introduced into a frame connected to the vehicle. The locking device has at least one gear that can be locked by at least one lock operating device and also has at least one energy absorbing device.

8 Claims, 5 Drawing Sheets

US 6,705,558 B2

SEAT BELT RETRACTOR WITH A LOAD LIMITER

FIELD OF THE INVENTION

The present invention relates to a seat belt retractor with a load limiter.

1. Background of the Invention

A seat belt system prevents a vehicle occupant from sustaining injuries in a crash as a result of colliding with the interior structure of the vehicle. In a crash, a locking device locks the seat belt webbing such that further extraction of the seat belt webbing due to the forces acting upon the vehicle occupant is prevented and the vehicle occupant is held in the seat through the belt force achieved by the locking.

2. Prior Art

In known seat belt retractors, it has been shown to be a disadvantage that the belt force is independent of the characteristics of a particular crash and/or the vehicle occupant. In these cases the belt force is determined on the basis of mean values, for instance the average weight of vehicle occupants or mean crash values. If the vehicle occupant, however, weighs less than the average weight, even though the belt force indeed is able to prevent the person from sustaining an injury due to colliding with a component inside the vehicle, the belt force can be too great for this person and cause him/her harm.

SUMMARY OF THE INVENTION

A seat belt retractor according to the present invention has a locking device with at least one gear that is reversibly lockable by at least one lock operating device, and has at least one energy absorbing device. Therefore, the belt force resulting from the locking of the seat belt retractor in a crash can follow the crash pulse, or that parameters dependent on people, such as for instance the weight of the vehicle occupant, can be taken into account. In particular it is possible, after an initially high level of belt force, to decrease the latter to a reduced level. The seat belt retractor can be an automatic retractor.

DETAILED DESCRIPTION OF THE INVENTION

The invention will be described in more detail with reference to the figures. In this context it must be noted that used terms such as "left", "right", "below" and "above" refer to the figures with normally legible figure designations.

Figure 1:
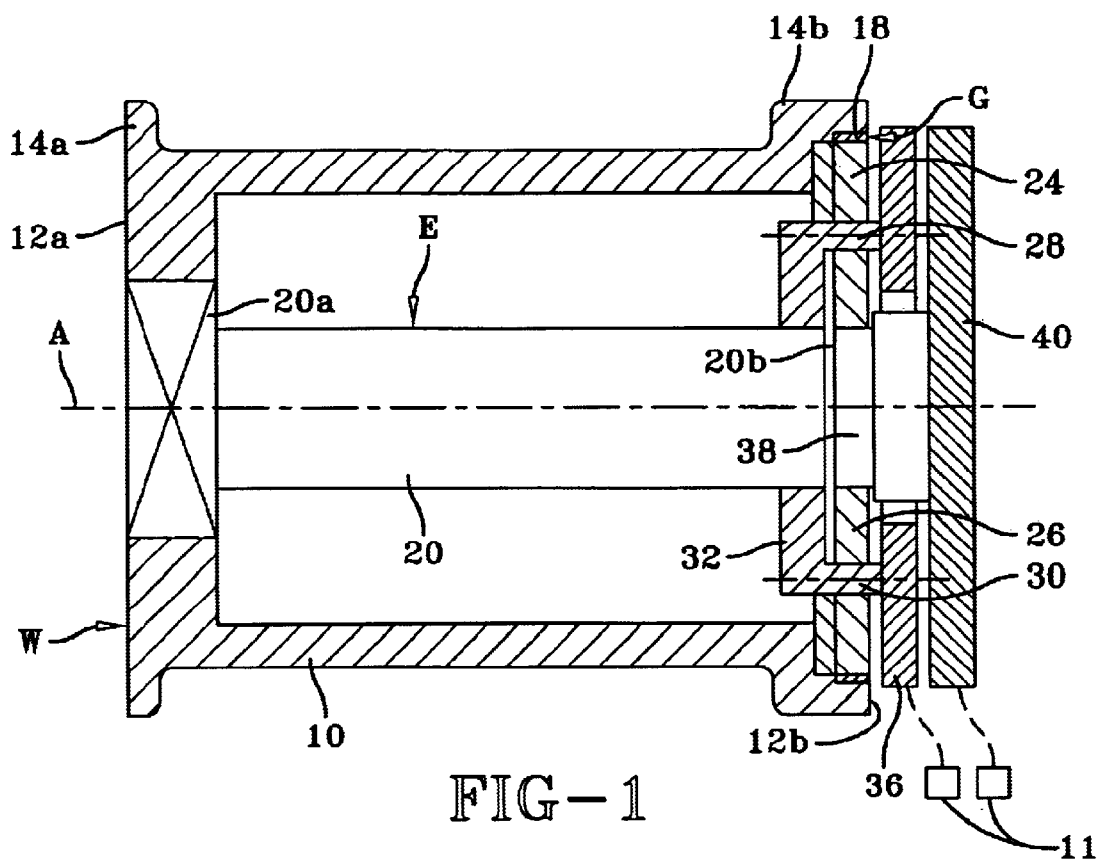
FIG. 1 is a diagrammatic longitudinal cross-sectional view of a first embodiment of the present invention.

FIG. 1 is a diagrammatic longitudinal cross-sectional view of a first embodiment of a seat belt retractor according to the invention. A seat belt retractor according to the invention has a belt reel W for the winding and unwinding of a seat belt webbing, which is not shown in detail. The belt reel has an axis of rotation that is indicated by the letter "A". A locking device for the locking of the belt reel W against further rotation is formed by at least one gear G, that can be locked by at least one lock operating device, and an energy absorbing device E. The gear can be any suitable gear, such as a single-stage spur wheel gear. A seat belt retractor according to the invention can be provided with a pre-locking device to pre-lock the belt reel against further rotation and to adjust the belt reel locking effected by the locking device.

The belt reel W comprises a hollow cylinder-like member 10 that is preferably made of metal. At the left and right ends 12a, 12b, the hollow cylinder-like member 10 is in each case provided with a flange 14a, 14b extending by at least substantially 90° to the axis of rotation A of the belt reel W and are used to guide seat belt webbing, not further represented, during winding and unwinding of the belt webbing. The left end 12a of the belt reel 10 is closed, while the right end 12b comprises an opening 16, in which at least part of the gear G is arranged. The right flange 14b of the belt reel 10 displays in the represented cross sectional view of FIG. 1 the shape of an upside down "L", whereby on the inside of the horizontal leg of the letter "L" an internal gear toothing 18 is provided. This internal gear toothing 18 or the right flange 14b of the hollow cylinder-like member 10 of the belt reel W forms a ring gear for the gear G.

Coaxially to the axis of rotation A of the belt reel W, inside of the belt reel W, an energy absorbing device E that is a torque rod 20 is arranged. At its left end 20a, the torque rod 20 is non-rotatably connected to the belt reel W at the latter's left end 12a. The non-rotatable connection between the torque rod 20 and the left end 12a of the belt reel W can for instance be achieved in that the left end 20a of the torque rod 20 is a square that is pressed into a correspondingly designed, not further represented, opening. The right end 20b of the torque rod 20 forms part of the gear G. Alternatively, the end of the energy absorbing device that is a component of the gear is non-rotatably connected with a sun wheel of a planetary gear. Preferably, in all embodiments of the invention being disclosed herein, each torque rod along most of its length has a circular cross section. In the case of two energy absorbing devices that are both two torque rods, there is the possibility, for the adjustment of the force gradient by designing the torque rods with the same diameter or with different diameters. There is also the possibility of manufacturing the torque rods out of different materials, so that various force gradients can be elicited.

The gear G can be a control gear that allows the control process to be triggered by various events and/or means. The control gear may be an infinitely variable control gear wherein a continuous, automatic adjustment of the belt force is enabled. Alternatively, the control gear may be a graduated control gear with at least two control grades that can be progressively enabled. An example of a graduated control gear would be a planetary gear. If the gear is a planetary gear, the ring gear and/or the sun wheel and/or the planet wheel carrier of the planetary gear can be locked in each case by a lock operating device. In principle this results in the possibility of being able to obtain various force gradients. There is also the possibility of using one and the same planetary gear in the sense of a construction set with various embodiments.

The gear G shown in the figures is a planetary gear. The ring gear of this planetary gear is formed by internal gear toothing 18 of the right flange 14b of the belt reel W. Furthermore the planetary gear comprises two planet wheels 24, 26, which are arranged on journals 28, 30. The journals 28, 30 each have a longitudinal axis (not represented) that extends at least substantially parallel to the axis of rotation A of the belt reel W. The journals are connected in a non-rotatable manner to a planet wheel carrier 32, which in turn is non-rotatably connected to the right end 20b of the torque rod 20. The planet wheel carrier 32 can for instance comprise a flange.

A first lock operating device 36, which can be locked by a not further represented lock operating member, is positioned in a non-rotatable manner on the journals 28, 30. This can for instance be a wheel 36 provided with an external gear having gear teeth with a saw tooth shape and which cooperates with a pawl for locking the planet wheel carrier 32. Alternatively, the lock operating device may comprise at least one electric motor for locking, and if necessary for releasing, the gear G. It is a further alternative that the lock operating device may comprise at least one pyrotechnical device.

The gear G also comprises a sun wheel 38 arranged concentrically to the axis of rotation A of the belt reel W and which engages both planet wheels 24, 26 and is connected to a second lock operating device 40. The second lock operating device can comprise a wheel 40 which, as can be seen from FIG. 1, is provided at the right front side of the seat belt retractor and at its outer side can be foreseen with a corresponding saw tooth profile, which cooperates with a lock operating member that is a pawl.

The control process can be carried out in dependence of the length of the unrolled seat belt webbing. Alternatively, the control process can be carried out in dependence of a signal supplied by a means for electronically evaluating a crash, many of which are well known in the art. The evaluation electronics can comprise, for example, a weight sensor that is arranged under a seat to detect the weight of a vehicle occupant. In order to carry out a control process, it is possible that least one sensor is provided for the gear to trigger the control process in dependence on a preset parameter. This preset parameter can, for example, comprise the value of the negative acceleration in a crash, whereby the crash pulse can be taken into account. The sensor can comprise very different elements, for example, the sensor may be a "mechanical sensor", as for instance a shearing pin, which shears off when a mechanical load is exceeded and interrupts the active connection of the first planetary gear to the lock operating device, thereby triggering the control process for the graduated gear.

In a crash, first the first lock operating device 36 can be locked, so that the pulling force exerted by the forward moving vehicle occupant or the hereby resulting belt force is transferred to the belt reel W at a transmission ratio of 1:1. On the basis of the energy absorbing device E that is a torque rod 20, the force, which is applied on the seat belt webbing and thus the belt reel W due to the forwards moving vehicle occupant, can be taken up through twisting of the torque rod 20. During the crash, alternatively the second lock operating device 40 can be locked, whereby the first lock operating device 36 is released. This way a reduction in belt pulling force can be achieved. First the second lock operating device 40 and subsequently the first lock operating device 36 can be locked, whereby in this case the second lock operating device 40 is released. The control of the actuation of the lock operating devices 36, 40 can be carried out by sensors, which actuate the lock operating devices 36, 40 in dependence on predetermined events, This actuation, i.e. in the case of blocking pawls in particular, the turning of the blocking pawl into the locking position, can be carried out pyrotechnically 11 or by electric motors 11. Since it is desirable to apply a reduced belt force at the end of a crash, it is advantageous if the energy absorbing device has a decreasing characteristic curve.

The energy absorbing device E may alternatively comprise an element that stores the absorbed energy at least partly and preferably does not release it back. In principle there is the possibility, however, that the energy absorbing device comprises a spring, which is then preferably prevented from releasing energy by locking of the spring.

In FIGS. 2 to 9, further embodiments of the invention are shown. In this context it must be noted that components, which are identical to components of the first embodiment according to FIG. 1, are provided with the same reference numerals, and those components which fulfil the same function as those of the first embodiment are provided with the same reference numerals, albeit increased by 100.

Figure 2:
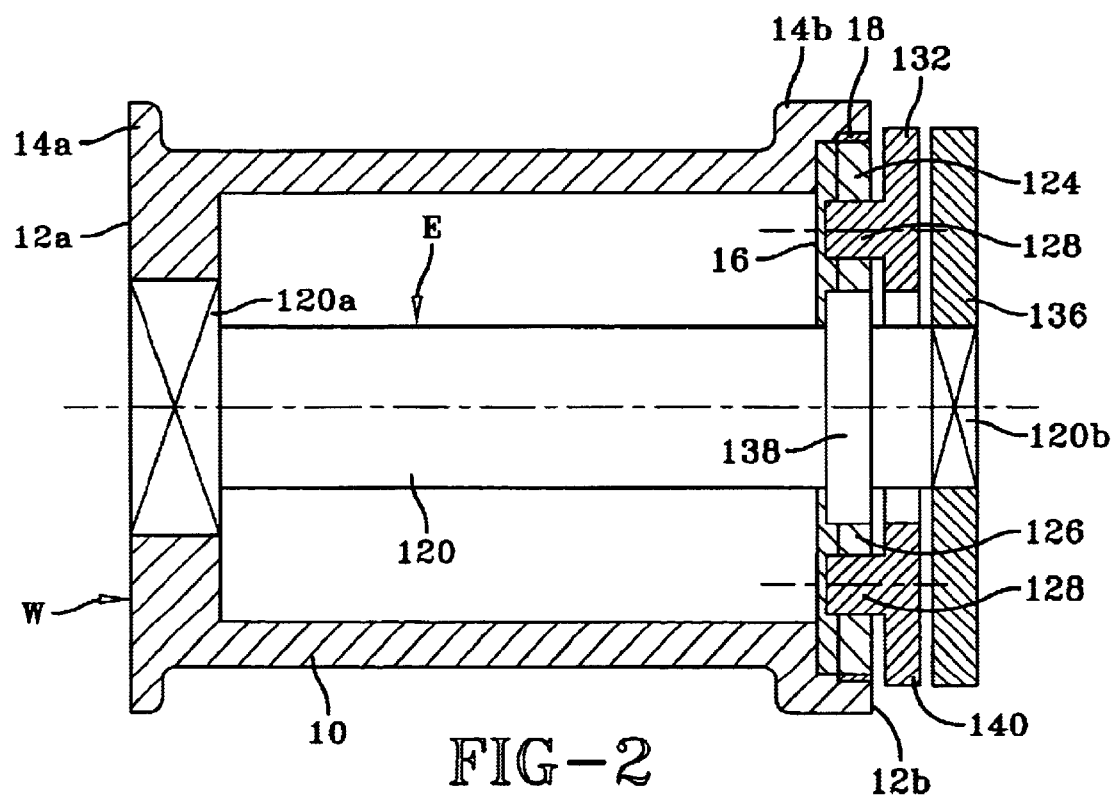
FIG. 2 is a diagrammatic longitudinal cross-sectional view of a second embodiment of the present invention.

The second embodiment shown in FIG. 2 differs from the first embodiment shown in FIG. 1 in that the torque rod 120 carries the sun wheel 138 of the planetary gear and at its right end 120b it carries a first lock operating device that is a blocking wheel 136 in a non-rotatable manner. The planet wheel carrier 132 is in this embodiment arranged in a rotatable manner with regard to the torque rod 120 and carries the planet wheels 124, 126 above the journals 128, 130. The planet wheels 124, 126 engage on the one hand the internal gear toothing 18 of the flange 14b forming the ring gear of the planetary gear as well as on the other hand the sun wheel 138. The planetary gear 132 in this embodiment forms the second lock operating device 140 and can be locked by suitable means, as described above in the context of the first embodiment.

In a crash, firstly the second lock operating device 140 can be locked, resulting in a transmission ratio of 1:1. In the further course of the crash, the second lock operating device 140 can be released and the first lock operating device 136, i.e. in particular the planet wheel carrier 132 can be locked. In this way a reduction in belt force is achieved. The release of the locking and its control can be carried out once again by means described in the context of the first embodiment.

A force gradient that varies during a crash can alternatively be influenced by the planet wheel carrier 32, 132 and the sun wheel 38, 138 of the planetary gear being alternatively locked in each case by a lock operating device. This alternative locking can, for example, be controlled by sensors that drive one or two electric motors or pyrotechnical units, which drive or actuate the lock operating devices of the planet wheel carrier and the sun wheel.

Figure 3A:
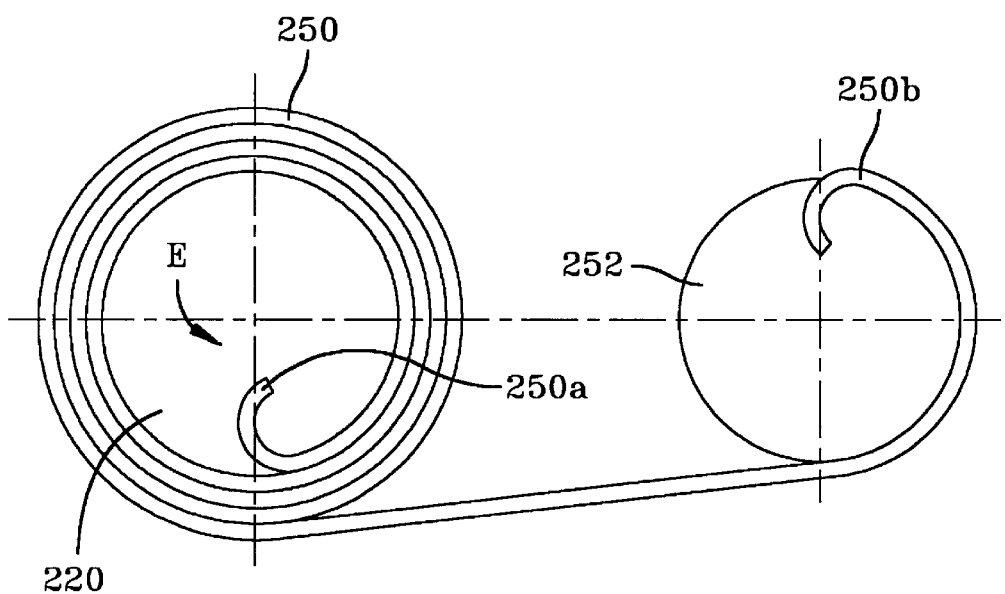
FIGS. 3a and 3b are diagrammatic radial cross sectional views of a third embodiment of the present invention.
Figure 3B:
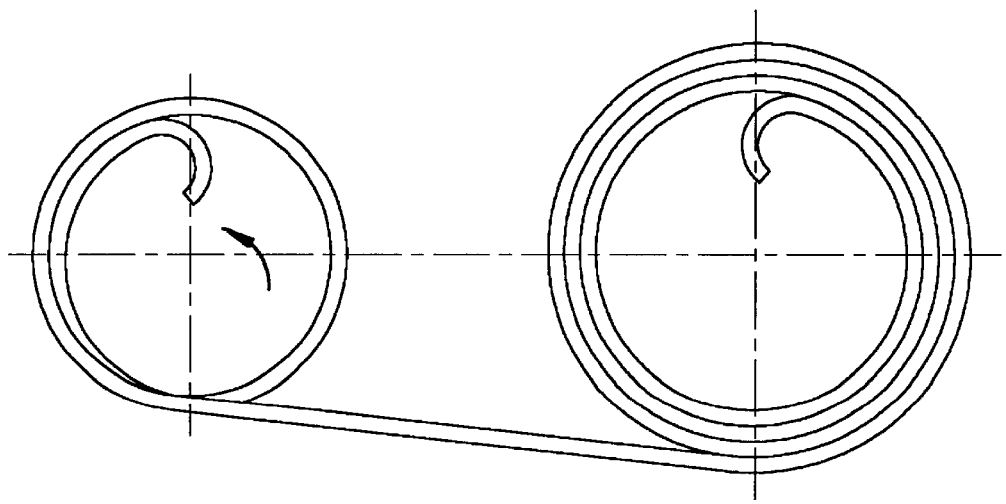

FIGS. 3a and 3b are diagrammatic radial cross sectional views a third embodiment of the present invention. In this embodiment, the gear comprises an infinitely variable gear that allows a continuous changing of the force exerted on seat belt webbing during a crash. The energy absorbing device E is in this embodiment is a torque rod 220, which is arranged at least substantially parallel to, but is eccentric to the axis of rotation A of the belt reel W of the not further represented belt reel. The torque rod 220 can rotate around the entire axis of rotation A of the belt reel W. A strip 250, made of any suitable material but preferably steel, has an end 250a that is securely fastened to the torque rod 220 and has another end 250b which is securely connected to a stationary receiver 252, which is non-rotatably connected to the lock operating device and is arranged concentrically to the axis of rotation A of the belt reel W. In the starting position shown in FIG. 3a the strip 250 is rolled around the torque rod 220 in several layers.

During the rotation of the torque rod 220 around the stationary receiver 252, the strip 250 unwinds from the torque rod 220 and onto the stationary receiver 252 as shown in FIG. 3b. As a result, the torque rod 220 is twisted and thus achieves a belt force limitation, which is continuously changed. Due on the one hand to the decreasing value of the torque rod force transmission diameter and simultaneously the increasing receiver force transmission diameter, the transmission ratio is continuously changing and thus the transmitted torque, or the force. The transmission ratio is in this case dependent on the diameter of the belt winding, the diameter of the torque rod 220, the diameter of the receiver 252 and the strength of the strip 250.

Figure 4:
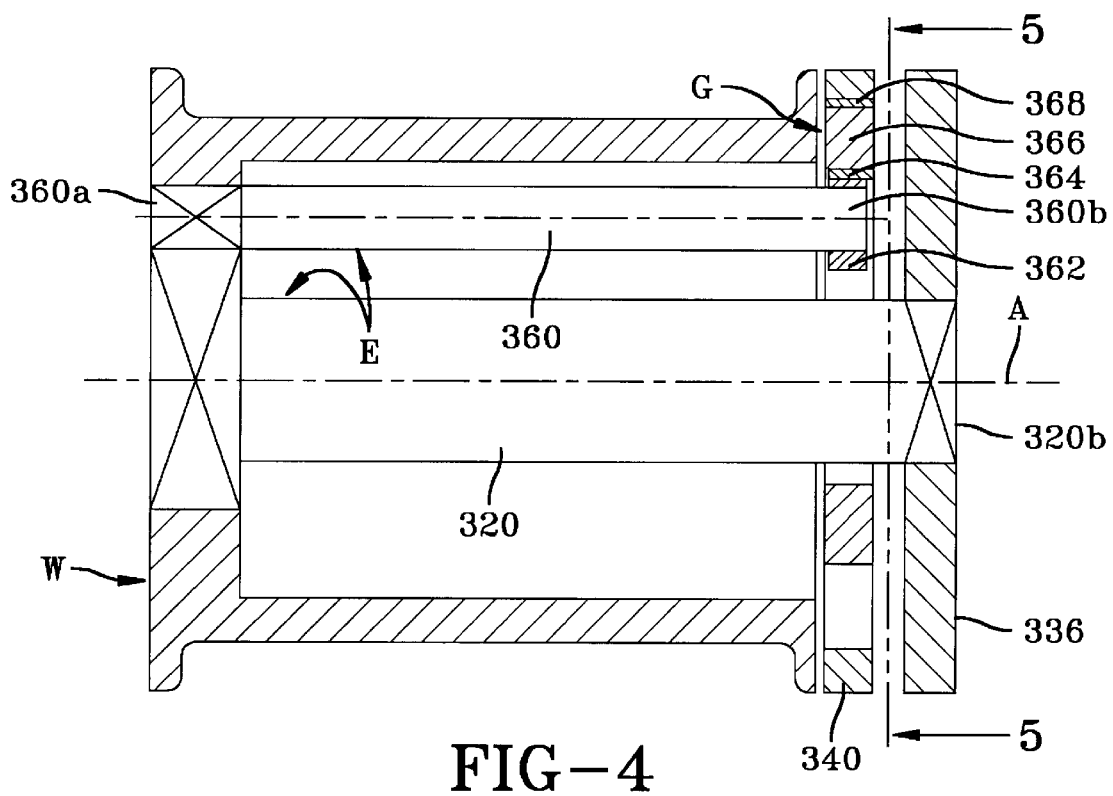
FIG. 4 is a diagrammatic longitudinal cross-sectional view of a fourth embodiment of the present invention.
Figure 5:
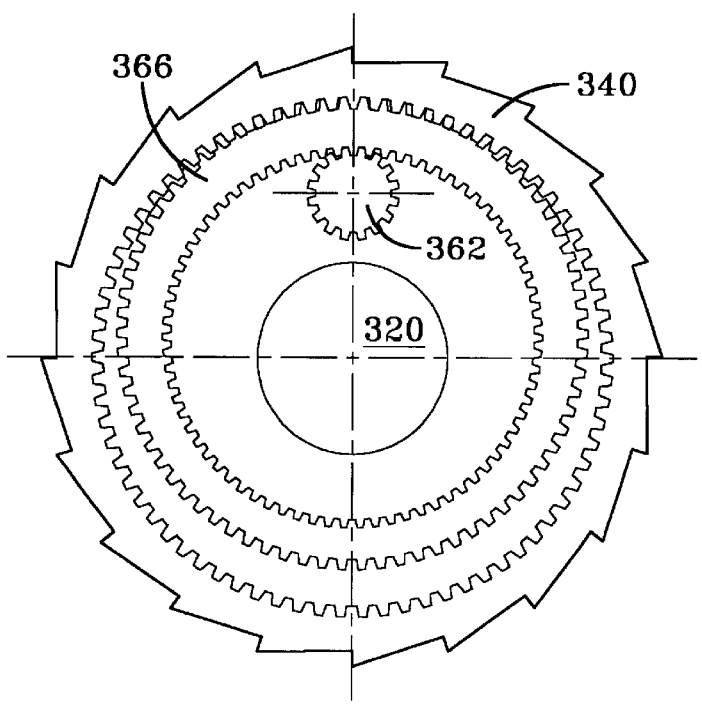
FIG. 5 is a top view of a section along line 5—5 in FIG. 4.

In FIGS. 4 and 5, a fourth embodiment of the present invention is represented. This embodiment has two energy absorbing devices E in the form of two torque rods 320, 360. The first torque rod 320 is arranged inside the belt reel W. A right end 320b of the torque rod 320 is connected to a first lock operating device 336 in a non-rotatable manner. At least substantially parallel to the axis but eccentrically to the first torque rod 320, a second torque rod 360 is provided inside the belt reel W has a left end 360a that is connected to the belt reel in a non-rotatable manner. At the right end 360b of the second torque rod 360 a toothed gear 362 is positioned, which engages the internal gear toothing 364 of a wobble plate 366. The toothed gear 362 and the wobble plate 366 together form a single-stage gear G. This once again means there is a possibility of applying a the belt force that is not constant through the crash, but is modified to the extent, for instance, that the belt force is lowered to a reduced force level at the end of the crash.

It has been shown to be advantageous if the toothed gear of the gear that engages the toothed gear of the second energy absorbing device is a wobble plate 366 rotating around the axis of rotation A of the belt reel W and comprises an internal gear that engages the toothed gear 362 of the second energy absorbing device 360 and an external gear which engages the second lock operating device. The second lock operating device preferably comprises a rotatable ring gear which is arranged concentrically to the axis of rotation of the belt reel. This way the first and the second lock operating devices can at least initially be activated together and, after the occurrence of a predetermined event, the second lock operating device can be put out of operation.

The wobble plate 366 is arranged around the torque rod 320 in a non-rotatable manner. The wobble plate 366 furthermore comprises an external gear tooth 368, which engages a second lock operating device 340.

In the case of a relative movement of the belt reel W with regard to the second lock operating device 340, the second torque rod 360 with the toothed gear 362 rolls off the second lock operating device 340 via the wobble plate 366. The thus transmitted/reduced torque of the torque rod 360 exerts a corresponding force flow onto the seat belt webbing.

The belt force limitation can be influenced by the interruption of the force flow from a second torque rod 360. This force flow interruption can for instance take place depending on the belt reel rotational axis or else for instance pyrotechnically by supplied ignition signals.

Figure 6:
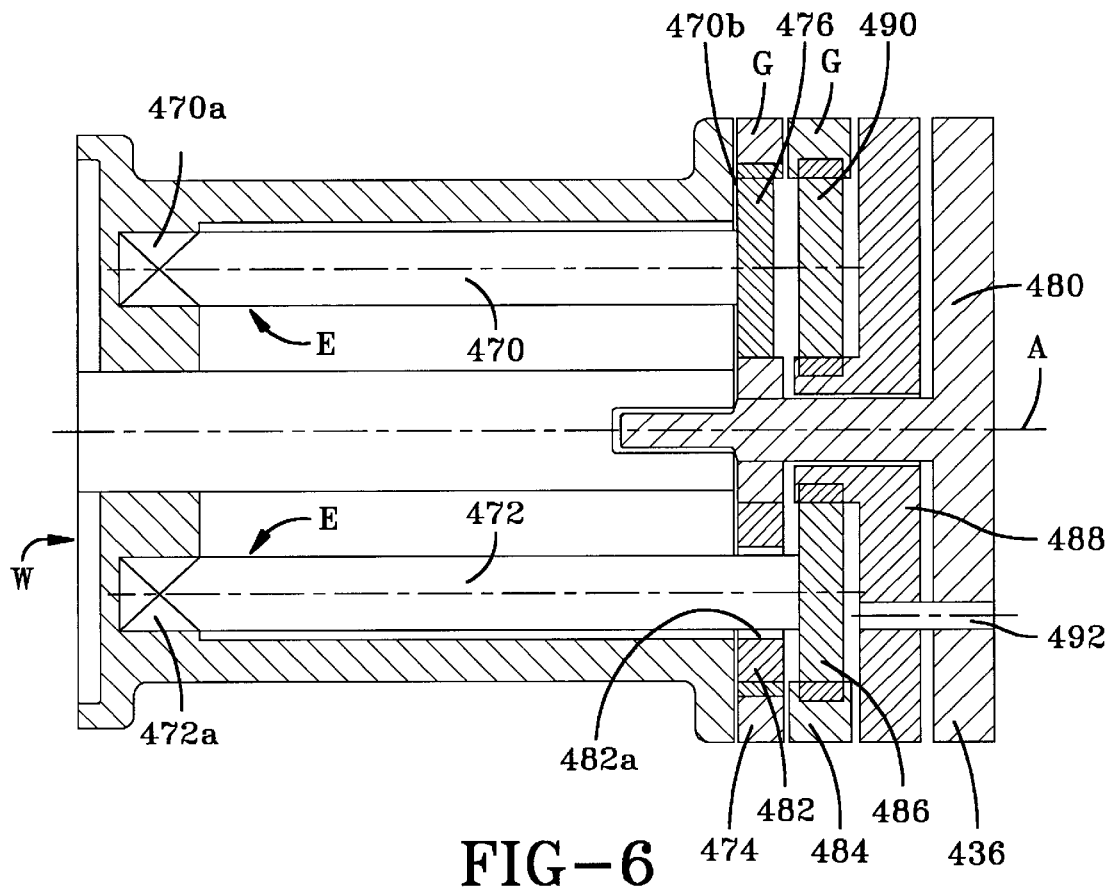
FIG. 6 is a diagrammatic longitudinal cross-sectional view of a fifth embodiment of the present invention.

FIG. 6 is a diagrammatic longitudinal cross-sectional view of a fifth embodiment of the present invention. This differs from the first embodiment shown in FIG. 1 in that two energy absorbing devices that are two torque rods 470, 472 are provided, which are arranged at least substantially parallel to the axis of rotation A of the belt reel W, but eccentrically to the axis of rotation A of the belt reel W inside the belt reel. Each of the torque rods 470, 472 has a left end 470a, 473a that is connected to the belt reel W in a non-rotatable manner. A particularly simple and space-saving structure can be achieved if the first gear, with relation to the axis of rotation of the belt reel, is arranged axially behind the second gear. In this case the first and the second gear can comprise a planetary gear.

The gear G of this embodiment is formed by two planetary gears, each of which interacts with one of the two torque rods 470, 472. The planetary gear interacting with the first torque rod 470 comprises a ring gear 474, a planet wheel 476, which is connected to the torque rod 470 at the latter's right end 470b in a non-rotatable manner, as well as a sun wheel 478, which is arranged on a sun wheel carrier shaft 480, which has a right end that comprises a first lock operating device in the form of a blocking wheel 436. To support the first planetary gear, a blind wheel 482 is arranged at an angle of at least substantially 180° to the planet wheel 476 and positioned on the second torque rod 472 in a non-rotatable manner. The blind wheel 482 comprises a connecting opening 482a which is used for the insertion of the second torque rod 472.

The second planetary gear also comprises a ring gear 484, which displays the same outer diameter as well as an internal gear toothing with the same diameter as the ring gear 474, and which is arranged to the right of the ring gear 474. In addition, the torque rod 472 is connected in a non-rotatable manner to the planet wheel 486, which in addition engages the sun wheel 488, which is rotatably arranged around the sun wheel shaft 480. This planetary gear also comprises a blind wheel 490 that is used as a support and is arranged in the same manner as the blind wheel 482 of the first planetary gear. The sun wheel 488 of the second planetary gear is connected by a shearing pin 492 to the blocking wheel 436.

In a crash in which a high level of force is required, both torque rods 470, 472 are engaged and the force or the moment of force which is exerted on the sun wheel plate 488, is transferred via the shearing pin 492 to the outer blocking wheel 436. If a reduced force level is required, an interruption of the force flow through the shearing off of the shearing pin 492 can take place in such a manner that the sun wheel plate 488 idles along with it. The shearing off of the shearing pin can take place in various ways. For example the shearing off may take place via pyrotechnic means or that the shearing pin shears off if a predetermined mechanical load overloading of the sun wheel 488, preferably larger than 3 kN, is exceeded.

In this fifth embodiment the first and the second energy absorbing devices can be actively connected with the lock operating device by the first and second gear either isochronously or alternatively, respectively alternately. In the case of an alternative active connection with the lock operating device, there is the possibility of providing control as desired, to the effect that initially the first and subsequently the second energy absorbing device or initially the second and subsequently the first energy absorbing device is actively connected to the lock operating device.

Figure 7:
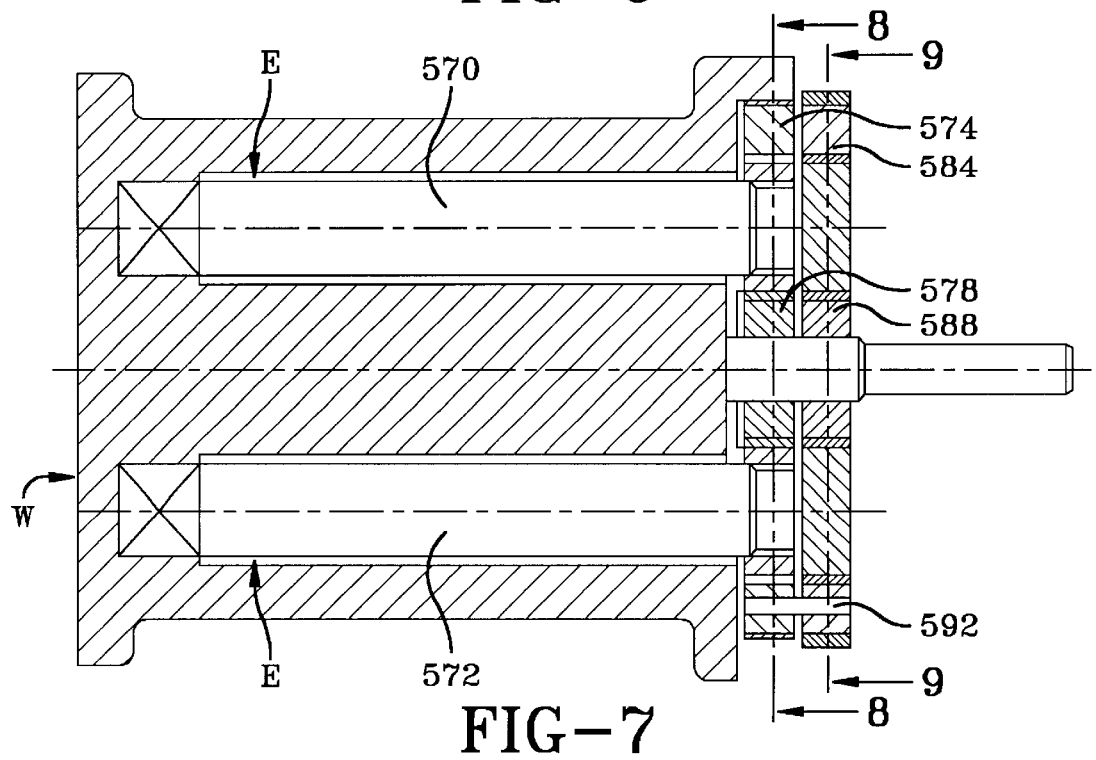
FIG. 7 is a diagrammatic longitudinal cross-sectional view of a sixth embodiment of the present invention.
Figure 8:
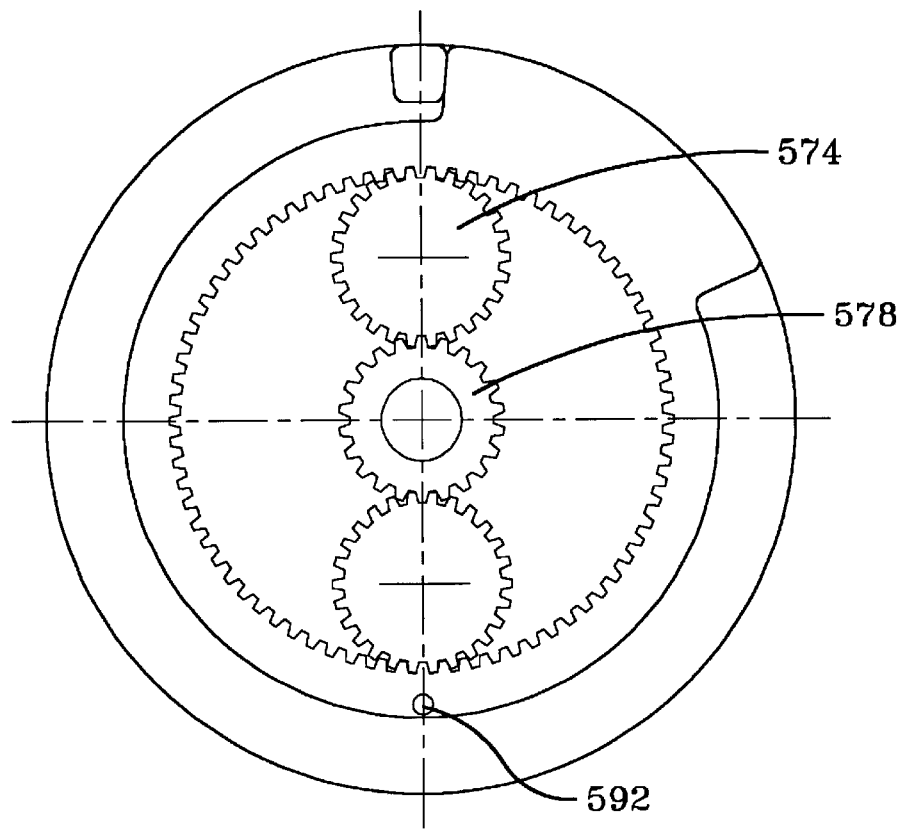
FIG. 8 is an enlarged radial cross sectional view of the sixth embodiment taken along line 8—8 in FIG. 7.
Figure 9:
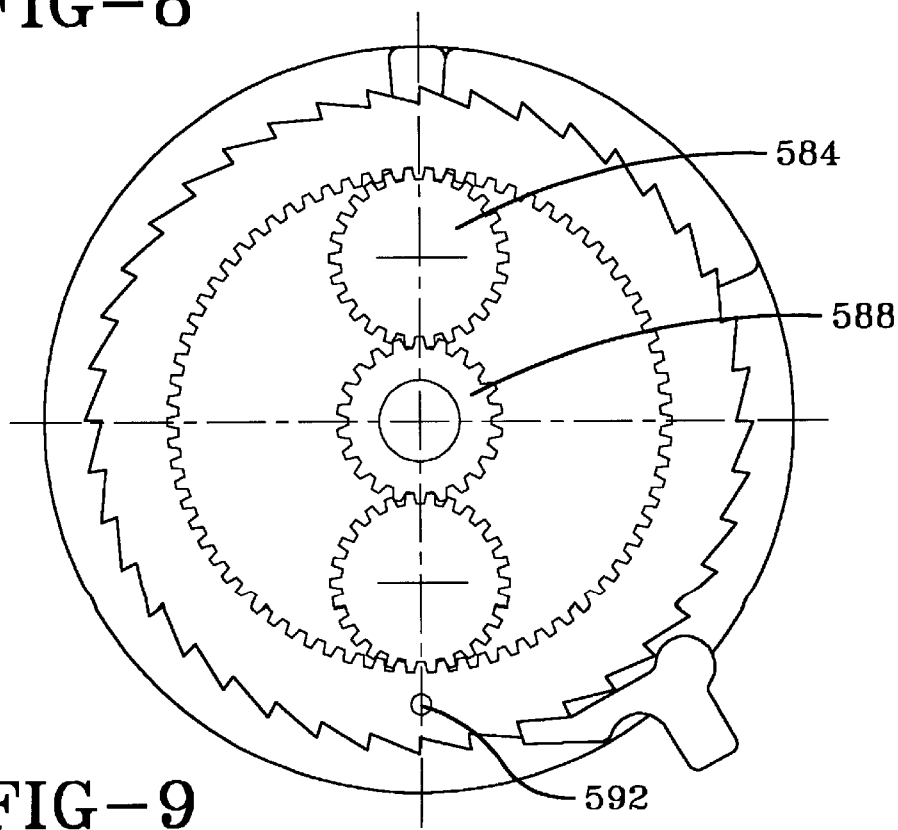
FIG. 9 is an enlarged radial cross sectional view of the sixth embodiment taken along line 9–9' in FIG. 7.

In FIGS. 7 to 9, a sixth embodiment of the present invention is shown, which corresponds essentially to the embodiment according to FIG. 6 with the difference that both sun wheels 578, 588 idle along loosely. The force transmission during the locking takes place via both ring gears 574, 584, whereby the ring gear 484 removed from the belt reel W is connected to the blocking wheel or comprises the blocking wheel itself. In the case of a high required level of force, both torque shafts 570, 572 are engaged and locked over the blocking wheel. As in the embodiment according to FIG. 6, the blocking wheel and the ring gear 574, which is positioned on an end of the belt reel W, are connected to one another via a shearing pin 592. In the case of a low required level of force, the force flow is counterbalanced by the shearing pin in the same manner as mentioned in the context of FIG. 6.

From the foregoing, it will be apparent to those skilled in the art that modifications may be made without departing from the spirit and scope of the invention. Accordingly, the invention is not intended to be limited except as may be made necessary by the appended claims.

We claim:

1. A seat belt retractor comprising;
    a belt reel for the winding and unwinding of a seat belt webbing;
    a first lock operating device arranged beside the belt reel wherein the first lock operating device is connected to a energy absorbing device; and
    a second lock operating device arranged adjacent to the first lock operating device whereby the first lock operating device is disposed between the belt reel and the second operating device, wherein a planetary gear connects the belt reel with the second lock operating device.

2. The seat belt retractor according to claim 1 wherein the first lock operating device comprises an electric motor, the second lock operating device comprises an electric motor.

3. The seat belt retractor according to claim 1 wherein the first lock operating device comprises at least one pyrotechnical device, the second lock operating device comprises at least one pyrotechnical device.

4. The seat belt retractor according to claim 1 wherein the planetary gear is locked by the second lock operating device.

5. The seat belt retractor according to claim 1 wherein to energy absorbing device comprises a torque rod.

6. The seat belt retractor according to claim 5 wherein the planetary gear comprises a ring gear, two planet wheels, and a sun wheel, wherein the second lock operating device is connected to the sun wheel, to ring gear is formed by internal gear tooting on the belt reel, whereby the sun wheel engages with the planet wheels and the planet wheels engage with the ring gear.

7. The seat belt retractor according to claim 6 wherein the first lock operating device is disposed between the planetary gear and to second lock operating device.

8. The seat belt retractor according to claim 1 wherein the energy absorbing device is a torque rod arranged concentrically with the axis of rotation of the belt reel inside the belt reel, an end of the torque rod is connected in a non-rotatable manner to the belt reel.

* * * * *